(12) United States Patent
Matsuo et al.

(10) Patent No.: US 8,585,358 B2
(45) Date of Patent: Nov. 19, 2013

(54) WIND TURBINE GENERATOR INCLUDING AIR-COOLED HEAT EXCHANGER

(75) Inventors: Takeshi Matsuo, Tokyo (JP); Yasushi Okano, Tokyo (JP); Tomohiro Numajiri, Tokyo (JP); Taisuke Nakamura, Tokyo (JP); Chuuhachi Gotou, Tokyo (JP); Shigeto Hirai, Tokyo (JP); Shinsuke Sato, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 309 days.

(21) Appl. No.: 13/042,987

(22) Filed: Mar. 8, 2011

(65) Prior Publication Data
US 2011/0272949 A1  Nov. 10, 2011

(30) Foreign Application Priority Data
Mar. 17, 2010  (JP) ................. 2010-060376

(51) Int. Cl.
*F01D 5/08* (2006.01)
(52) U.S. Cl.
USPC .......................... 415/176; 290/55
(58) Field of Classification Search
USPC ........................... 290/55; 415/176
See application file for complete search history.

(56) References Cited

U.S. PATENT DOCUMENTS

| | | | |
|---|---|---|---|
| 7,057,305 B2 * | 6/2006 | Kruger-Gotzmann et al. | 290/55 |
| 7,161,260 B2 | 1/2007 | Kruger-Gotzmann et al. | |
| 7,967,550 B2 * | 6/2011 | Grevsen et al. | 415/1 |
| 8,047,774 B2 * | 11/2011 | Bagepalli | 415/176 |
| 8,052,383 B2 * | 11/2011 | Frokjaer | 415/178 |
| 8,082,748 B2 * | 12/2011 | Matsuo et al. | 62/236 |
| 2008/0298964 A1 * | 12/2008 | Rimmen | 416/39 |
| 2010/0061853 A1 | 3/2010 | Bagepalli | |

FOREIGN PATENT DOCUMENTS

| | | |
|---|---|---|
| CN | 101235801 A  * | 8/2008 |
| DE | 202004020094 U1 * | 4/2005 |
| JP | 04353228 A  * | 12/1992 |
| JP | 2006313055 A  * | 11/2006 |
| JP | 2009-185641 A | 8/2009 |
| WO | WO 2008092449 A2 * | 8/2008 |
| WO | WO 2010/024650 A2 | 3/2010 |

OTHER PUBLICATIONS

JPO, Notice of Allowance for JP 2010-060376, Jul. 24, 2012.

* cited by examiner

*Primary Examiner* — Joseph Waks
(74) *Attorney, Agent, or Firm* — Manabu Kanesaka; Kenneth M. Berner; Benjamin J. Hauptman

(57) ABSTRACT

Provided is a wind turbine generator in which the intake air temperature of an air-cooled heat exchanger disposed in a nacelle is decreased to allow efficient heat exchange. A wind turbine generator that generates electric power in such a manner that a rotor head that rotates when receiving wind power drives a generator installed inside a nacelle, the nacelle being installed at the upper end of a tower that is vertically erected on a foundation, and the wind turbine generator including a closed-circuit lubricating-oil circulation system in which lubricating oil circulates through devices installed inside the nacelle, wherein an air-cooled heat exchanger installed in the lubricating-oil circulation system to cool the lubricating oil by heat exchange with air is provided in a region separate from nacelle air.

16 Claims, 7 Drawing Sheets

WIND TURBINE GENERATOR INCLUDING AIR-COOLED HEAT EXCHANGER

RELATED APPLICATIONS

This application is based on Japanese Patent Application No. 2010-060376, the content of which is incorporated herein by reference.

TECHNICAL FIELD

The present invention relates to a wind turbine generator equipped with a heat exchanger for use in cooling devices inside a nacelle.

BACKGROUND ART

A wind turbine generator (hereinafter also referred to as "wind turbine") is an apparatus that generates electric power with a generator that is driven in such a manner that a rotor head equipped with wind turbine blades rotates when receiving wind power and increases the rotational speed using a gearbox.

The rotor head described above is attached to an end of a rotatable nacelle that is mounted on a wind turbine tower (hereinafter referred to as "tower") and is supported so as to be rotatable about a substantially horizontal lateral rotation axis.

The nacelle of the wind turbine generator accommodates, as a general device configuration, a transmission unit for mechanical rotational power received from the wind turbine blades and a power generation unit. Between these, the rotational-power transmission unit is equipped with a main shaft bearing and a gearbox, and the power generation unit is equipped with a generator, a transformer, an inverter, and a control panel, or a generator and a control panel.

In such devices inside the nacelle, for the main shaft bearing and the gearbox that constitute the mechanical transmission unit, lubricating of the rotating portions and cooling of frictional heat are performed using lubricating oil circulating in a lubricating-oil circulation system 10, as shown in FIG. 6, for example.

In FIG. 6, reference sign 1 denotes a wind turbine generator, 2 denotes a tower, 3 denotes a nacelle, 4 denotes a rotor head, 5 denotes a wind turbine blade, 6 denotes an air intake portion, 7 denotes an exhaust portion, 8 denotes a main shaft bearing, 9 denotes a gearbox, and arrow Ah indicates heat radiation.

The lubricating-oil circulation system 10 described above is equipped with an oil tank 11 that stores lubricating oil, an oil pump 12 that circulates the lubricating oil, and an oil cooler 13 that cools the lubricating oil by exchanging heat with the outside air and connects these devices with a lubricating oil pipe 14 to form a closed-circuit lubricating oil circulation passage in the nacelle 3. The oil tank 11 is provided, for example, in the gearbox 9.

In the drawing, reference sign 13a denotes an oil cooler fan, 15 denotes a bypass pipe that forms a lubricating oil passage that bypasses the oil cooler 13, 16 denotes a bypass valve that is provided in the bypass pipe and opens in a state in which the lubricating oil temperature is lower than a predetermined value, 17 denotes an oil filter provided downstream of the oil pump 12, and 18 denotes an oil heater that heats the lubricating oil in the oil tank 11.

That is, the bypass valve 16 is a valve that opens when the lubricating oil increases in viscosity at a low temperature to cause a large pressure loss exceeding a predetermined value when it passes through the oil cooler to open the bypass pipe 15, and the oil heater 18 is used when the wind turbine generator 1 is started under the condition that the lubricating oil temperature is lower than a predetermined temperature, such as when the outside air is in a cold state. A heat exchanger using plate fins is often used as the oil cooler 13.

The outside air that exchanges heat with the lubricating oil in the oil cooler 13 described above is taken in through the air intake portion 6 provided at the lower portion of the front end face of the nacelle 3, as indicated by arrow Ao in the drawing, by operation of the oil cooler fan 13a. The outside air flows inside the nacelle 3 to ventilate it, passes through the oil cooler 13 to absorb heat from the lubricating oil, and is finally discharged outside through the exhaust portion 7 that opens at the top of the nacelle 3.

The air intake portion 6 that introduces the outside air is provided with a louver 6a and a salt-proof, dust-proof filter 6b, as shown in FIG. 7, for example.

Of the devices installed in the nacelle 3, examples of the other heat sources include a transformer 21, an inverter 22, a control panel (not shown), and a generator 23 connected to the rotor head 4, as shown in FIGS. 8 and 9, for example.

The inverter 22 is often equipped with a cooling system 30 that uses cooling water because an internal electric device 22a generates a lot of heat.

The inverter cooling system 30 is constituted by an endothermic heat exchanger 31 that cools the internal electric device 22a, a cooling-water pump 32, a cooling-water filter 33, a cooling-water tank 34, and a radiative heat exchanger 35, as shown in FIG. 8, for example, and constitutes a closed-circuit cooling water circulation system connected by a refrigerant pipe 36. However, the inverter 22 is sometimes installed outside the nacelle 3, for example, at the lower portion of the tower 2. Reference sign 35a in the drawing denotes the fan of the radiative heat exchanger 35.

The transformer 21 is often cooled such that the outer surface of a coil 21a is cooled by air because of its electrical insulation. The outside air or nacelle air is used as the air. However, the transformer 21 is sometimes installed outside the nacelle 3, for example, at the lower portion of the tower 2, like the inverter 22.

A cooling system 40 for the generator 23 is constituted by a closed primary-system cooling system 40A including the winding of the generator 23 and a secondary-system cooling system 40B. Reference sign 23a in the drawing denotes the rotor of the generator 23, and 23b denotes the stator.

The primary-system cooling system 40A often uses air as a cooling medium because of its electrical insulation. The primary-system cooling system 40A shown in FIG. 9 forms a primary airflow indicated by arrow A1 by operating a primary-system air fan 41.

On the other hand, the secondary-system cooling system 40B is equipped with a heat exchanger 42 that exchanges heat between the nacelle air and the primary-system air. In the heat exchanger 42 in this case, the primary-system air circulates to absorb heat from the generator 23, and the primary-system air that has increased in temperature radiates heat into the nacelle air. Reference sign 43 in the drawing denotes a secondary air fan, which takes in the nacelle air or the like and supplies it to the heat exchanger 42, and the secondary-system air that has exchanged heat with the primary system air passes through an exhaust passage 44 and is discharged outside the nacelle 3 through an exhaust port 44a.

Alternatively, an intermediate medium, such as cooling water, is sometimes used to constitute the cooling system.

Patent Literatures 1 and 2 below disclose taking the outside air in and out independently from the nacelle air to/from a generator heat exchanger disposed in or at the upper part of the nacelle. In this case, a fluid in a primary system that constitutes a closed system is air, which differs from the present patent.

CITATION LIST

Patent Literature

{PTL 1} U.S. Pat. No. 7,057,305
{PTL 2} U.S. Pat. No. 7,161,260

SUMMARY OF INVENTION

Technical Problem

The oil cooler 13 of the related art described above exchanges heat by introducing the outside air through the intake port provided inside the nacelle 3, as shown in FIG. 6. The exhaust air that has increased in temperature due to the heat exchange is guided to the exhaust portion 7 through a separate duct 13b and flows out of the nacelle 3 through the opening of the exhaust portion 7.

In this case, the outside air that the oil cooler 13 takes in receives heat exhausted from electronic devices (control panel and so on) installed in the nacelle 3 and furthermore receives heat by passing through the surfaces of high-temperature devices, such as the main shaft bearing 8 and the gearbox 9. Therefore, the temperature of the outside air that the oil cooler 13 has taken in (intake air temperature) becomes higher than the outside air temperature immediately after it is introduced to the nacelle 3 through the air intake portion 6.

On the other hand, the efficiency of maintaining the lubricating oil that is cooled by the oil cooler 13 below a predetermined upper limit temperature is increased as the temperature difference between the outside air temperature and the intake air temperature is increased. Accordingly, to reduce the heat transfer area of the oil cooler 13 to achieve miniaturization, the intake air temperature needs to be decreased.

Furthermore, since the power output of recent wind turbine generators 1 tends to increase, the heat transfer area required for the oil cooler 13 and the necessary amount of nacelle air are also increased. Accordingly, it is desirable that the intake air temperature of the oil cooler 13 be decreased also to solve the problems involved with increasing the size of the wind turbine generator 1.

Furthermore, in the case where the wind turbine generator 1 is installed in coastal regions, the function of the filter 6b attached to the air intake portion 6 includes salt removal in addition to dust proofing to prevent outside air containing salt from being introduced into the nacelle 3. The filter 6b having such a salt removing function increases pressure loss due to passage of the outside air, thus posing a problem in that the operation of the oil cooler fan 13a and so on requires excessive power consumption to take in a necessary amount of cooing outside air for the oil cooler 13.

However, decreasing the intake air temperature of the oil cooler 13 decreases the necessary amount of cooling air, and thus, power consumption necessary for operating the oil cooler fan 13a and so on can also be reduced.

The present invention solves the problems described above, and an object thereof is to provide a wind turbine generator in which the intake air temperature of an air-cooled heat exchanger installed in the nacelle is decreased to allow efficient heat exchange.

Solution to Problem

The present invention adopts the following solutions to solve the problems described above.

A wind turbine generator according to a first aspect of the present invention is a wind turbine generator that generates electric power in such a manner that a rotor head that rotates when receiving wind power with wind turbine blades drives a generator installed inside a nacelle, the nacelle being installed at the upper end of a tower that is vertically erected on a foundation, and the wind turbine generator including a closed-circuit lubricating-oil circulation system in which lubricating oil circulates through devices installed inside the nacelle, wherein an air-cooled heat exchanger installed in the lubricating-oil circulation system to cool the lubricating oil by heat exchange with air is provided in a region separate from nacelle air.

With such a wind turbine generator, since an air-cooled heat exchanger installed in the lubricating-oil circulation system to cool the lubricating oil by heat exchange with air is provided in a region separate from nacelle air, the outside air that is not influenced by the heat of the devices inside the nacelle, etc. can be directly introduced as intake air of the air-cooled heat exchanger to perform heat exchange. In other words, the temperature of intake air for use in heat exchange of the air-cooled heat exchanger is decreased to increase the temperature difference between it and the lubricating oil flowing in the air-cooled heat exchanger, thus allowing efficient heat exchange.

A wind turbine generator according to a second aspect of the present invention is a wind turbine generator that generates electric power in such a manner that a rotor head that rotates when receiving wind power with wind turbine blades drives a generator installed inside a nacelle, the nacelle being installed at the upper end of a tower that is vertically erected on a foundation, and the wind turbine generator including a closed-circuit lubricating-oil circulation system in which lubricating oil circulates through devices installed inside the nacelle, the wind turbine generator comprising a refrigerant heat exchanger installed in the lubricating-oil circulation system to cool the lubricating oil by heat exchange with a refrigerant and an air-cooled heat exchanger that cools the refrigerant by heat exchange with air, wherein the air-cooled heat exchanger is provided in a region separate from nacelle air.

With such a wind turbine generator, since a refrigerant heat exchanger installed in the lubricating-oil circulation system to cool the lubricating oil by heat exchange with a refrigerant and an air-cooled heat exchanger that cools the refrigerant by heat exchange with air are provided, and the air-cooled heat exchanger is provided in a region separate from nacelle air, the outside air that is not influenced by the heat of the devices inside the nacelle, etc. can be directly introduced as intake air of the air-cooled heat exchanger to perform heat exchange. In other words, the temperature of intake air for use in heat exchange of the air-cooled heat exchanger is decreased to increase the temperature difference between it and the refrigerant flowing in the air-cooled heat exchanger, thus allowing efficient heat exchange.

In the first and second aspects described above, preferably, the region separate from the nacelle air is an air intake-exhaust section formed to communicate with the interior of the nacelle via an opening provided in a wall surface of the nacelle.

In this case, it is preferable to have a sound absorbing chamber, in the air intake-exhaust section, formed by changing the cross-sectional area thereof, which can reduce the noise of the fan leaking to the outside of the nacelle. Furthermore, it is preferable that a droplet sump in which a predetermined amount of droplets can be held be provided below the air-cooled heat exchanger provided in the air intake-exhaust section. Thus, in the event of leakage of the lubricating oil, condensate, or the like from the air-cooled heat exchanger, it can be reliably collected.

Furthermore, it is preferable to dispose a heat insulator on a wall surface of the air intake-exhaust section, which can prevent an increase in temperature of the interior of the nacelle due to exhaust heat.

Furthermore, in the invention described above, preferably, the air intake duct or the exhaust duct is of a separated type, which facilitates on-site work and maintenance.

Advantageous Effects of Invention

According to the present invention described above, since the air-cooled heat exchanger disposed inside the nacelle of the wind turbine generator to directly or indirectly cool the lubricating oil directly introduces the outside air, the intake air temperature is reduced and, a large temperature difference can be ensured between the temperature of the lubricating oil or the refrigerant flowing in the air-cooled heat exchanger and the intake air temperature, thus allowing efficient heat exchange. In other words, outside air that is not influenced by the heat of the devices inside the nacelle, etc. can be directly introduced as intake air of the air-cooled heat exchanger to perform heat exchange, and thus the temperature of intake air for use in heat exchange of the air-cooled heat exchanger is decreased to increase the temperature difference between it and the lubricating oil or the refrigerant flowing in the air-cooled heat exchanger, thus allowing efficient heat exchange.

DESCRIPTION OF EMBODIMENTS

Embodiments of a wind turbine generator according to the present invention will be described hereinbelow on the basis of the drawings.

Figure 2:
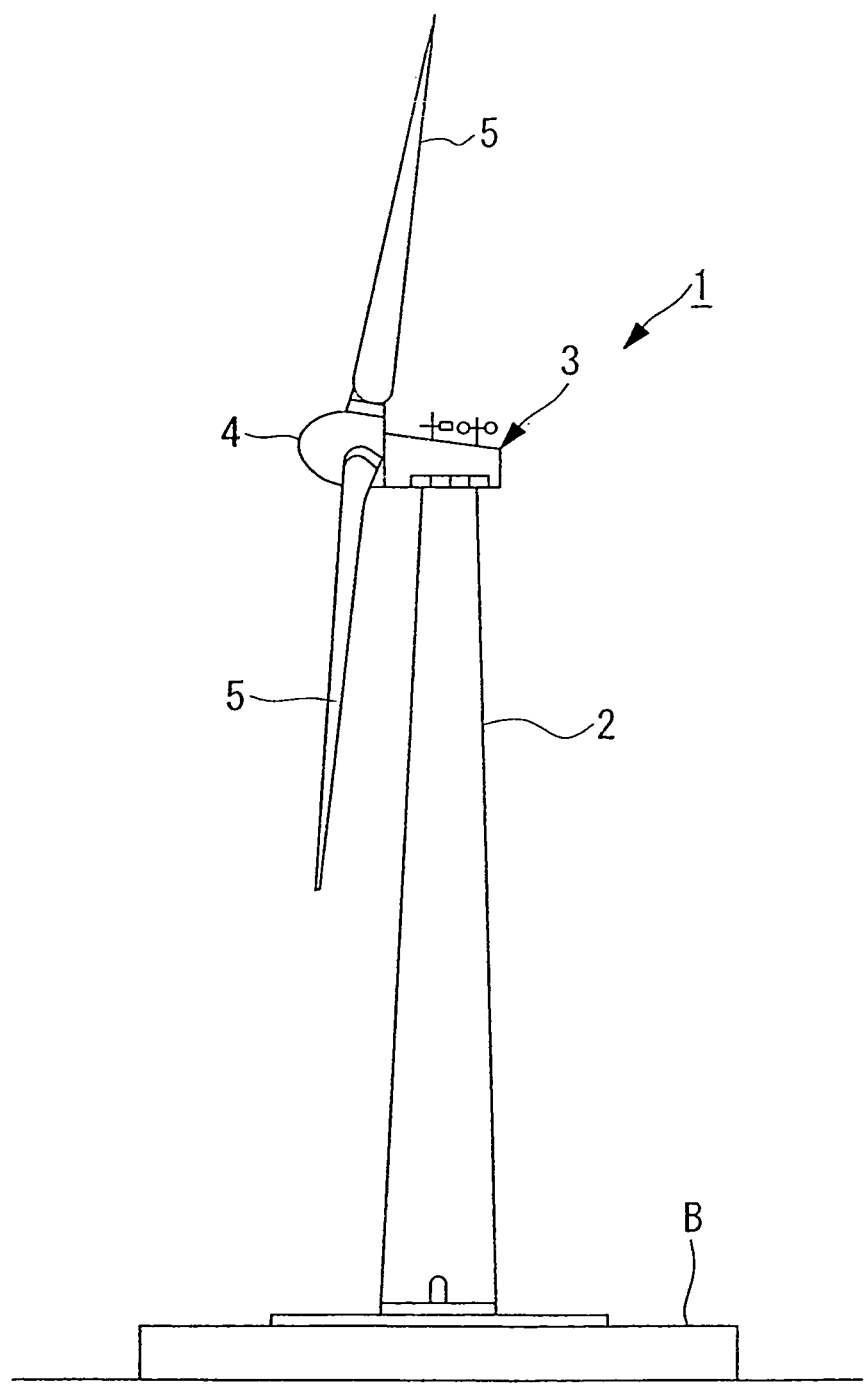
FIG. 2 is a side view showing, in outline, the wind turbine generator.

FIG. 2 is a side view showing, in outline, a wind turbine generator 1. The illustrated wind turbine generator 1 includes a wind turbine tower (hereinafter referred to as "tower") 2 that is vertically erected on a foundation B on land or off-shore, a nacelle 3 mounted at the upper end of the tower 2, and a rotor head 4 mounted at the front end of the nacelle 3 so as to be supported rotatably about the substantially horizontal lateral rotation axis thereof.

The rotor head 4 has a plurality of (for example, three) wind turbine blades 5 mounted in a radial pattern about its rotation axis. Thus, the power of wind blowing against the wind turbine blades 5 from the direction of the rotation axis of the rotor head 4 is converted to motive power that rotates the rotor head 4 about the rotation axis.

An anemometer that measures the wind speed value in the vicinity and an anemoscope that measures the wind direction are disposed at appropriate locations of the outer peripheral surface (for example, at the top, etc.) of the nacelle 3.

In other words, the wind turbine generator 1 generates electric power such that the rotor head 4 that rotates about the substantially horizontal rotation axis by receiving wind power with the wind turbine blades 5 drives a generator (not shown) installed in the nacelle 3, and the nacelle 3 is mounted rotatably on the upper end of the tower 2 that is vertically erected on the foundation B.

{First Embodiment}

The wind turbine generator 1 according to a first embodiment of the present invention, specifically, a lubricating-oil circulation system in the nacelle 3, will be described hereinbelow in detail with reference to FIG. 1.

The wind turbine generator 1 is equipped with a closed-circuit lubricating-oil circulation system 10A in which lubricating oil circulates through devices installed in the nacelle 3. The lubricating-oil circulation system 10A supplies lubricating oil to rotating portions and sliding portions that constitute a mechanical transmission unit, such as the main shaft bearing 8 and the gearbox 9, to lubricate them or cool them to reduce frictional heat.

The lubricating-oil circulation system 10A described above includes the oil tank 11 for storing lubricating oil provided, for example, in the gearbox 9, an oil pump 12A that circulates the lubricating oil, and the oil cooler (air-cooled heat exchanger) 13 that cools the lubricating oil by exchanging heat with the outside air and connects these devices with the lubricating oil pipe 14 to form a closed-circuit lubricating oil circulation passage in the nacelle 3. In the drawing, reference sign 13a denotes an oil cooler fan, 15 denotes a bypass pipe that forms a lubricating oil passage that bypasses the oil cooler 13, 16 denotes a bypass valve that is provided in the bypass pipe and opens in a state in which the lubricating oil temperature is lower than a predetermined value, and 18 denotes an oil heater that heats the lubricating oil in the oil tank 11.

In the illustrated configuration example, the oil pump 12A is disposed in the oil tank 11; however, it is not limited thereto. An oil filter is disposed at an appropriate location, although not shown.

In the thus-configured lubricating-oil circulation system 10A, the bypass valve 16 is closed during a normal operation. However, when the lubricating oil increases in viscosity at a low temperature to cause a large pressure loss exceeding a predetermined value when passing through the oil cooler 13, the bypass valve 16 is opened to open the bypass pipe 15. The oil heater 18 is used to start the wind turbine generator 1 under the condition that the lubricating oil temperature is lower than a predetermined temperature, such as when the outside air is in a cold state.

The oil cooler 13 installed in the foregoing lubricating-oil circulation system 10A is an air-cooled heat exchanger that cools the lubricating oil by exchanging heat with air, for which a heat exchanger using plate fins is generally used. To dispose the oil cooler 13 in an air intake-exhaust section separate from the nacelle air, this embodiment is provided with an air intake duct 51 and an exhaust duct 52 that communicate with the interior of the nacelle via an openings in the wall surface of the nacelle 3, and the oil cooler 13 is disposed in the air intake duct 51 and the exhaust duct 52.

In this case, the dedicated air intake duct 51 indicates a passage into which the outside air that exchanges heat with the oil cooler 13 to absorb the heat is introduced without direct mixture or contact with the nacelle air, and the dedicated exhaust duct 52 indicates a passage through which the high-temperature outside air (exhaust air) that has passed through the oil cooler 13 to absorb the heat is exhausted without direct mixture or contact with the nacelle air. The placement of the oil cooler 13 in the ducts is not limited to the illustrated form and may be nearer to either the air intake side or the exhaust side, or they may be disposed along the duct wall surface.

In the illustrated configuration example, the air intake duct 51 is disposed under the oil cooler 13, that is, at the lower rear of the nacelle 3, and the exhaust duct 52 is disposed above the oil cooler 13, that is, at the upper rear of the nacelle 3; however, the present invention is not limited to this orientation of the oil cooler 13.

The placement position of the oil cooler 13 in the nacelle 3 is also not limited to the rear of the nacelle 3; the present invention is not limited to this placement position of the oil cooler, such as at the front of the nacelle 3.

Figure 3:
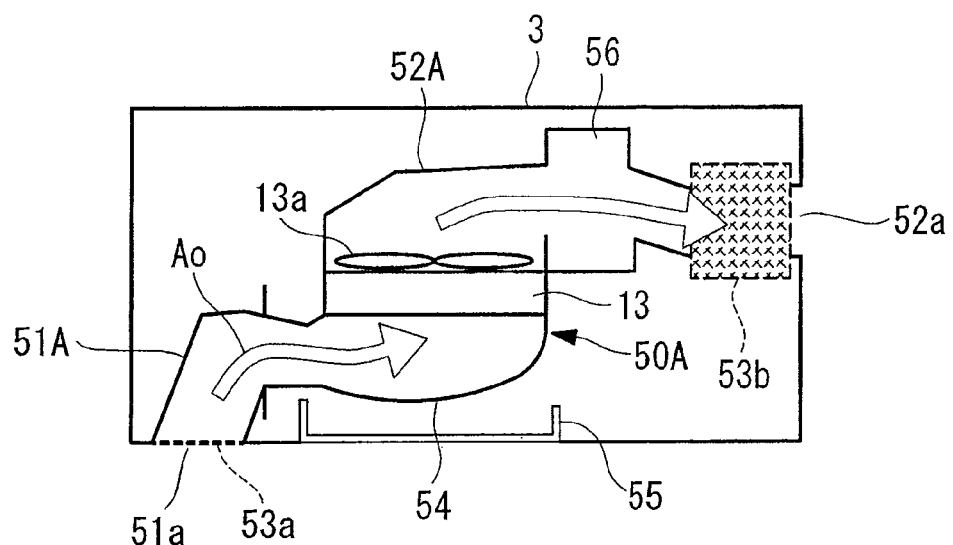
FIG. 3 is a diagram showing a first modification according to the first embodiment, showing a configuration example in which an air intake duct is provided with an oil sump.

Preferably, the air intake duct 51 and the exhaust duct 52 described above are such that an air intake port 51a and an exhaust port 52a that open in the wall surface of the nacelle 3 are fitted with simple wire meshes 53a and 53b or the like, as shown in FIG. 3, for example, to prevent a flying object, such as a bird, from entering the nacelle 3.

With such a wind turbine generator 1, since the oil cooler 13 installed in the lubricating-oil circulation system 10A to cool the lubricating oil by heat exchange with the air is disposed in the dedicated air intake duct 51 and exhaust duct 52 that open in the wall surface of the nacelle 3, the outside air that is not influenced by the heat of the heating devices etc. installed in the nacelle 3 can be directly introduced as intake air that passes through the oil cooler 13 to cool the lubricating oil to perform heat exchange. That is, the temperature of the intake air for use in heat exchange of the oil cooler 13 is decreased substantially to the outside air temperature to ensure a large temperature difference between it and the temperature of lubricating oil flowing in the oil cooler 13, and thus, the difference between the intake air temperature and the outside air temperature can be ignored, thus allowing efficient heat exchange.

Furthermore, since the air intake-exhaust duct 50 has no pressure losing member, such as a salt-proof or dust-proof filter, the pressure loss of the outside air can be reduced, and thus, the power consumption of the oil cooler fan 13a can be reduced.

Preferably, the air intake-exhaust duct 50 of the embodiment described above is configured such that the air intake duct 51A or the exhaust duct 52A has an oil sump 54 at a position below the oil cooler 13, as in a first modification shown in FIG. 3, for example. The oil sump 54 is a recessed portion or a curved portion formed in the air intake-exhaust duct 50 below the oil cooler 13.

With such an oil sump 54, the lubricating oil that has leaked from the oil cooler 13 drops into the oil sump 54 and is collected. The lubricating oil thus collected does not flow outside through the air intake-exhaust duct 50 because both the upstream side and downstream side of the oil sump 54 are above it.

For the same purpose, an oil pan 55 may be disposed below the oil sump 54, and furthermore, the combined use of the oil sump 54 and the oil pan 55 further ensures collection of leakage lubricating oil.

Furthermore, in the first modification shown in FIG. 3, a sound absorbing chamber 56 that is formed by increasing the cross-sectional area of the passage of the exhaust duct 52A is provided at an intermediate portion thereof to reduce the noise of the oil cooler fan 13a. The sound absorbing chamber 56 is installed as appropriate depending on the installation environment and so on of the wind turbine generator 1.

Figure 4:
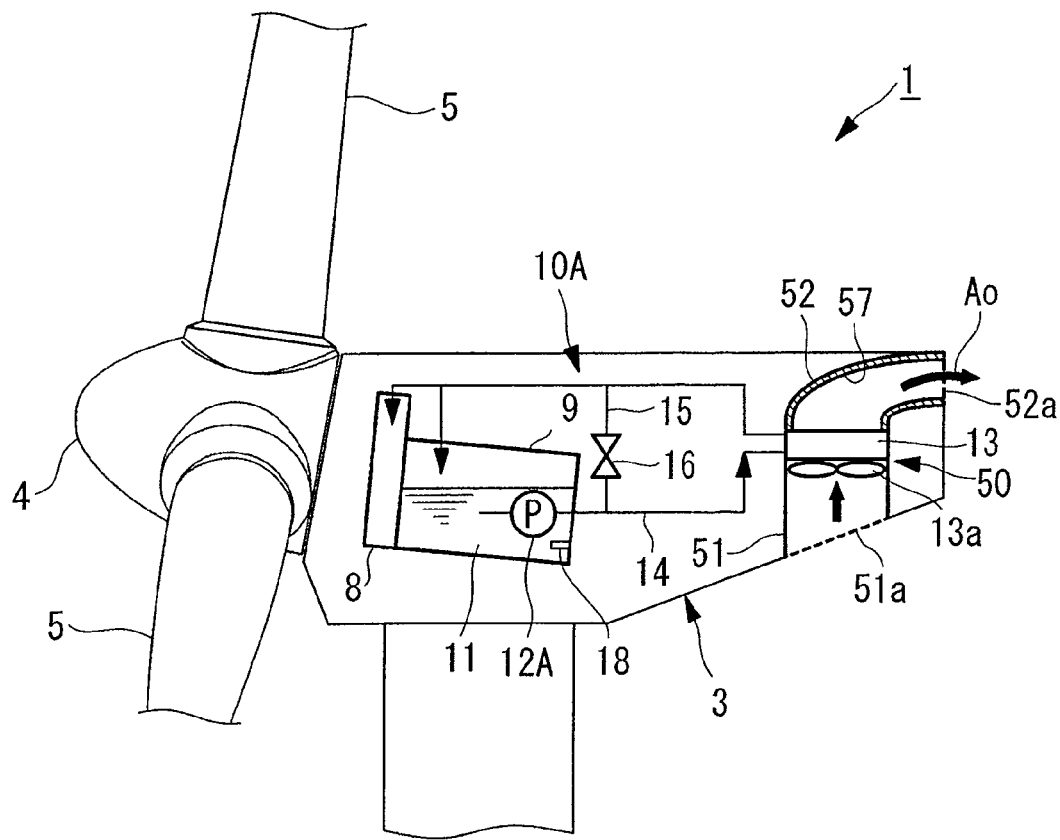
FIG. 4 is a diagram showing a second modification according to the first embodiment, showing a configuration example in which an exhaust duct is fitted with a heat insulator.

In a second modification shown in FIG. 4, the exhaust duct 52 is subjected to heat insulation treatment by attaching a heat insulator 57 thereto. Such heat insulation treatment can prevent an increase in the internal temperature of the nacelle 3 due to the high-temperature exhaust air that has absorbed heat in the oil cooler 13. The heat insulator 57 may also be mounted on the air intake duct 51 upstream of the oil cooler 13.

Figure 1:
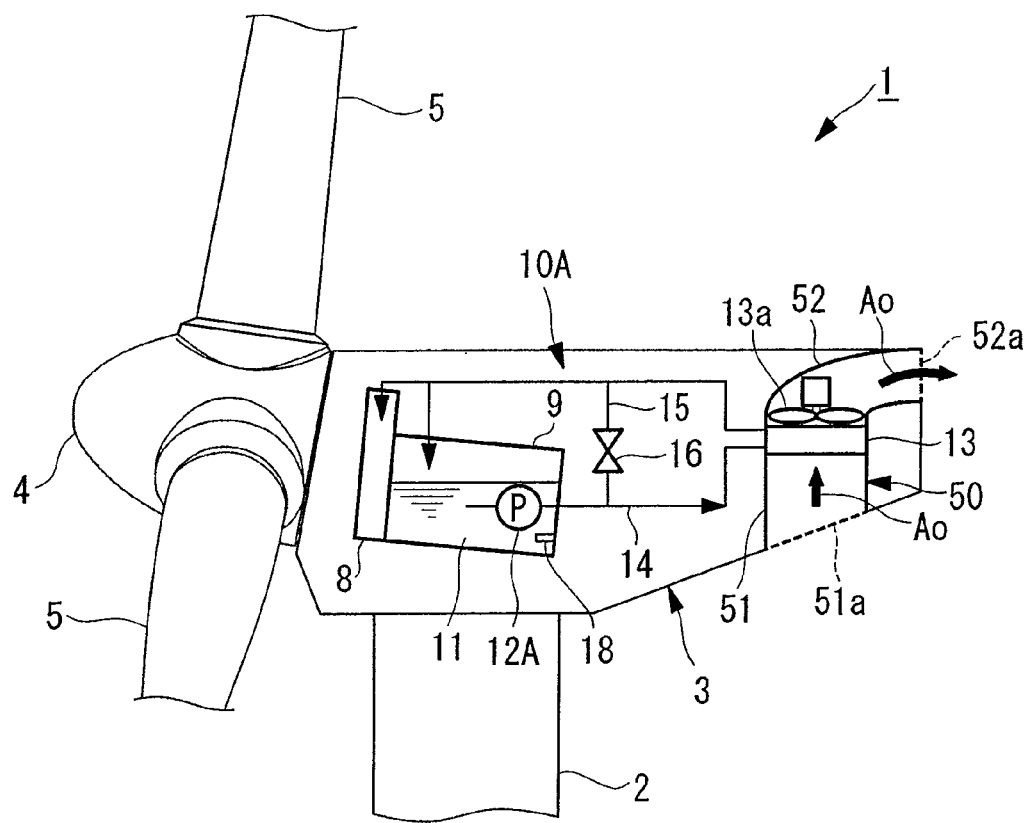
FIG. 1 is a system diagram showing a first embodiment concerning a lubricating-oil circulation system in a nacelle as a wind turbine generator according to the present invention.

Although the oil cooler 13 in FIG. 1 has the oil cooler fan 13a at the downstream side, it may be disposed at the upstream side, as shown in FIG. 4.

Although the oil cooler 13 in the drawing is disposed in the horizontal direction so that the outside air passes in the vertical direction, the oil cooler may be disposed so that the outside air passes in the horizontal direction.

In the configuration example of this embodiment, one oil cooler 13 is installed for the lubricating oil pipe that supplies lubricating oil to the main shaft bearing 8, the gearbox 9 and so on as one system; alternatively, for example, the lubricating oil pipe of the main shaft bearing 8 and the gearbox 9 may be separated into two systems, or alternatively, the number of oil coolers 13 may be one or more.

Furthermore, in this embodiment, only the lubricating oil pipe for the main shaft bearing 8 and the gearbox 9 is shown; however, since a similar lubricating oil pipe is provided when, for example, hydraulic pressure is used for pitch control of the wind turbine blades 5, a heat exchanger (not shown) installed in this lubricating oil pipe may also be provided with the air intake-exhaust duct 50 as in the foregoing embodiment.

Furthermore, it is preferable that the exhaust duct 51 and the air intake duct 52 have a configuration in which they are separated and an outside frame serves as a joint to facilitate on-site work, such as replacement and maintenance of the fan motor of the heat exchanger; however, the present invention is not limited thereto. To give a concrete example of the separated configuration suitable for the duct structure shown in FIG. 1, the separable configuration of the upstream side and the downstream side of the oil cooler 13 facilitates on-site work for the oil cooler 13 and the oil cooler fan 13a.

Furthermore, for the device configuration and so on of the other devices (not shown) installed in the nacelle 3, that is, the generator and the other electrical devices (the transformer 21, the inverter 22, and the control panel), the present invention is not particularly limited.

{Second Embodiment}

Figure 5:
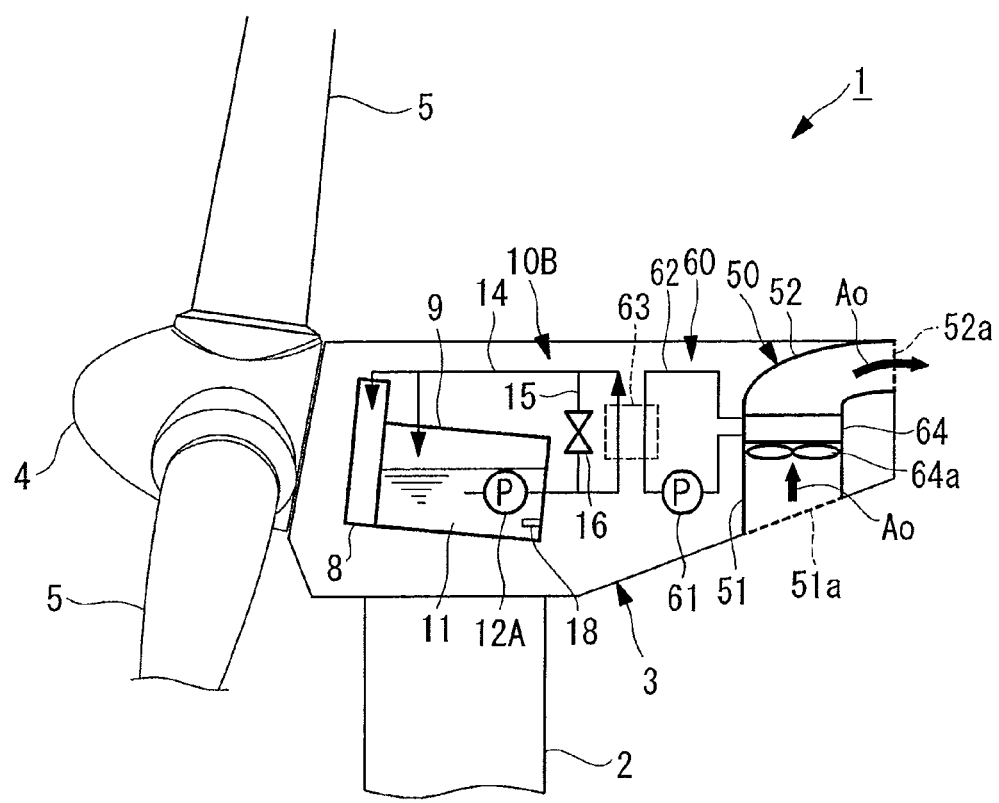
FIG. 5 is a system diagram showing a second embodiment concerning a lubricating-oil circulation system in a nacelle as a wind turbine generator according to the present invention.

Next, a second embodiment of the wind turbine generator according to the present invention, that is, a lubricating-oil circulation system in the nacelle 3, will be described on the basis of FIG. 5. Components the same as those in the foregoing embodiment are given the same reference signs, and detailed descriptions thereof will be omitted.

In this embodiment, the wind turbine generator 1 is equipped with a closed-circuit lubricating-oil circulation system 10B that lubricates the devices installed in the nacelle 3, and indirect cooling using a refrigerant (intermediate refrigerant) is employed to cool lubricating oil circulating in the lubricating-oil circulation system 10B.

The illustrated indirect cooling is equipped with a closed-circuit refrigerant circulation system 60 that circulates a refrigerant, such as water. This refrigerant circulation system 60 is equipped with a refrigerant pump 61 that circulates the refrigerant and a closed-circuit refrigerant pipe 62 that forms a passage through which the refrigerant circulates.

The refrigerant pipe 62 forms a closed-circuit intermediate-refrigerant circulation passage in which the refrigerant passes through a refrigerant heat exchanger 63 disposed downstream of the refrigerant pump 61 and an air-cooled heat exchanger 64 and returns to the refrigerant pump 61. The circulating direction of the refrigerant that flows through the refrigerant heat exchanger 63 and the air-cooled heat exchanger 64 may be the reverse.

The refrigerant heat exchanger 63 is a heat exchanger disposed in the lubricating-oil circulation system 10B to cool the lubricating oil by heat exchange with the refrigerant. That is, the refrigerant heat exchanger 63 is a heat exchanger in which the refrigerant absorbs heat from the high-temperature lubricating oil to cool it by heat exchange between the lubricating oil circulating in the lubricating-oil circulation system 10B and the refrigerant circulating in the refrigerant circulation system 60. Accordingly, the refrigerant heat exchanger 63 may be a component installed in the refrigerant circulation system 60.

The air-cooled heat exchanger 64 is a heat exchanger that cools the refrigerant by heat exchange with air. The air-cooled heat exchanger 64 is disposed in the dedicated air intake-exhaust duct 50, like the oil cooler 13 of the foregoing embodiment. That is, the air-cooled heat exchanger 64 is equipped with the dedicated air intake duct 51 and exhaust duct 52 that open in the wall surface of the nacelle 3. Reference sign 64a in the drawing denotes a cooler fan that introduces the outside air into the air-cooled heat exchanger 64.

Thus, the air-cooled heat exchanger 64 installed in the air intake-exhaust duct 50 can directly introduce the outside air that is not influenced by the heat of the devices in the nacelle 3, and the outside air absorbs heat from the refrigerant that has increased in temperature in the refrigerant heat exchanger 63 to cool it. In other words, by decreasing the temperature of intake air for use in heat exchange of the air-cooled heat exchanger 64 to increase the temperature difference between it and the refrigerant flowing in the air-cooled heat exchanger 64, the temperature difference between the intake air temperature and the outside air temperature can be ignored, thus allowing efficient heat exchange. Also in this embodiment, it is preferable that the exhaust duct 52 is subjected to heat insulating treatment.

As described above, this embodiment is equipped with the refrigerant heat exchanger 63 that is installed in the lubricating-oil circulation system 10B to cool the lubricating oil by heat exchange with the refrigerant and the air-cooled heat exchanger 64 that cools the refrigerant by heat exchange with the outside air (air) and is provided with the air intake-exhaust duct 50 that communicates with the interior of the nacelle via the opening in the wall surface of the nacelle 3 to form an air intake-exhaust section separate from nacelle air.

In other words, unlike the foregoing embodiment in which the oil cooler 13 is directly cooled by the outside air, indirect cooling in which the refrigerant cooled by the outside air cools the lubricating oil is employed. The air-cooled heat exchanger 64 that cools the refrigerant for indirect cooling is installed in the air intake-exhaust duct 50 to allow efficient heat exchange. The placement of the air-cooled heat exchanger 64 in the duct 50 is not limited to the illustrated configuration; it may be placed either on the air intake side or the exhaust side, or alternatively, it may be placed along the duct wall surface.

Also in this embodiment, since the air intake-exhaust duct 50 does not have a member such as a salt-proof or dust-proof filter, the pressure loss is small, and thus, the power consumption of the cooler fan 64a can be reduced.

Furthermore, since water is used as an intermediate medium (refrigerant), the lubricating oil does not flow through the air-cooled heat exchanger 64 installed in the air intake-exhaust duct 50, and thus, even if the lubricating oil leaks from the refrigerant heat exchanger 63, it can be kept in the nacelle 3, thus preventing it from flowing from the air intake-exhaust duct 50 to the outside of the nacelle 3.

Furthermore, since the pressure loss of water flowing in the pipe in a normal-use temperature region is lower than that of lubricating oil, the capacity of the oil pump 12A can be reduced by decreasing the circulation passage length of the lubricating oil.

Figure 8:
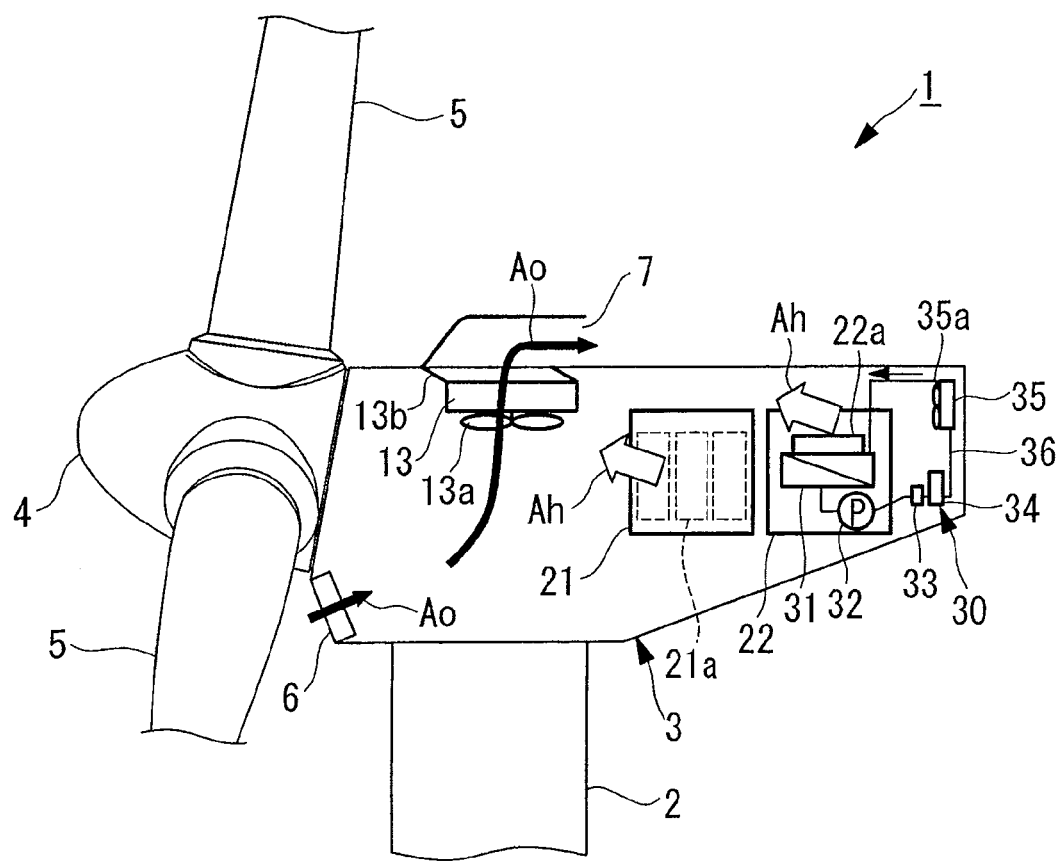
FIG. 8 is a system diagram showing an inverter cooling system in the nacelle according to a wind turbine generator of a related art example.
Figure 9:
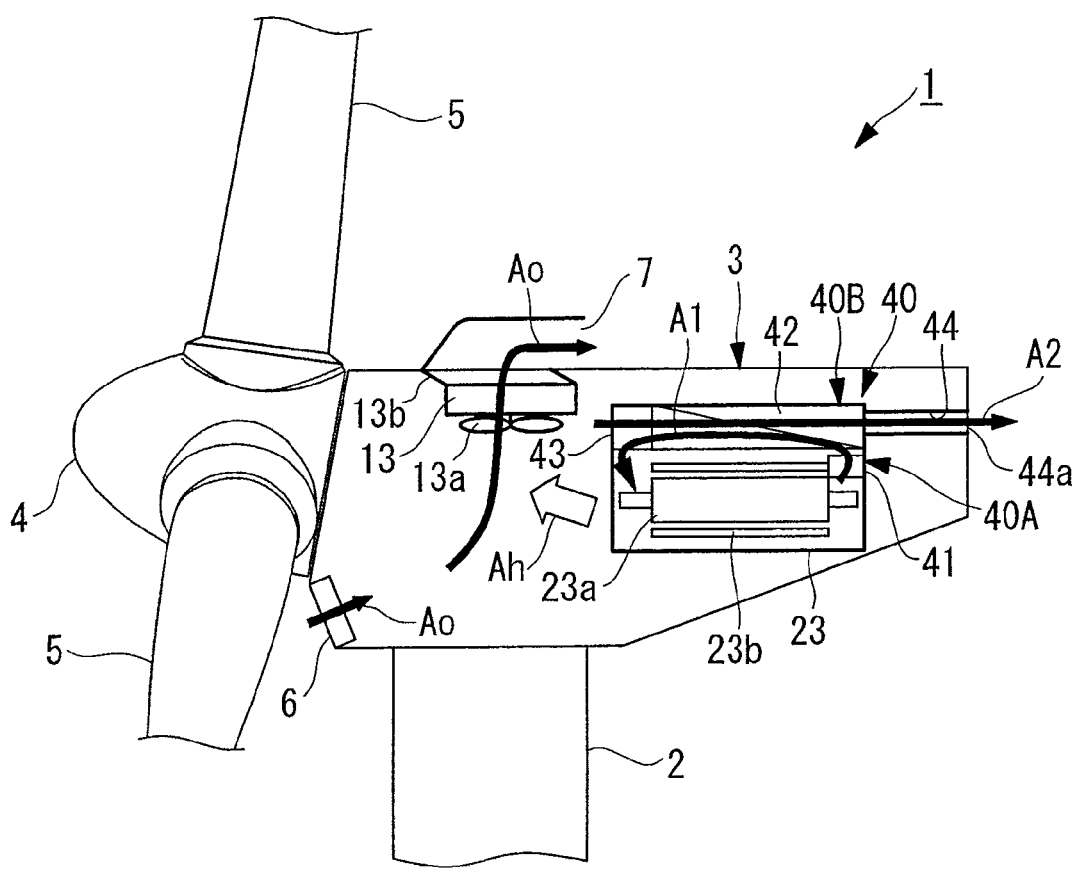
FIG. 9 is a system diagram showing a generator cooling system in the nacelle according to a wind turbine generator of a related art example.

The refrigerant circulation system 60 described above may be integrated with the cooling system 30 for the inverter 22, shown in FIG. 8, for example.

The operational advantages of the present invention will be described below using a specific example.

In general, the upper limit of the temperature of the lubricating oil is about 70° C. in view of the operating lives of sliding portions and engaging portions, such as the gearbox and the main shaft. For example, assuming it is daytime in the summer season and that the outside air temperature is 40° C. and the temperature difference between the nacelle air and the outside air is 10° C., the intake air temperature of the oil cooler 13 is 50° C. because the air taken into the nacelle 3 is taken in from the outside air, so that the temperature difference between the lubricating oil and the intake air at the inlet is 20° C., from "70° C. to 50° C.".

However, if the outside air is directly taken into the oil cooler 13, the inlet temperature difference between the lubricating oil and the intake air increases to 30° C., and thus, in the related art where air is taken into the nacelle 3, a heat transfer area necessary for the oil cooler 13 is about 33% larger as compared with this embodiment. That is, by adopting this embodiment, the performance of the heat exchanger can be used effectively, thus allowing the heat transfer area necessary for the oil cooler 13 to be remarkably reduced.

For example, with the terrestrial wind turbine generator 1, the per-unit power output is 2 to 3 MW, and with the offshore wind turbine generator 1, the per-unit power output reaches 5 to 6 MW. The total heat loss from the wind turbine generator 1 is 10 to 15% of a rated generated output; for example, with an off-shore wind turbine having a rated power output capacity of 6 MW, the total heat loss is extremely large, that is, 600 to 900 kW. The details of the total heat loss depend on the device configuration; it is generally said that, in the case of the oil cooler 13 for the gearbox and the main shaft bearing, it is about 35%, and in the case of the other devices, such as the transformer 21, the inverter 22, and auxiliary equipment, it is about 30%, and in such a situation, the required cooling capacity for the oil cooler 13 is about 210 to 315 kW.

Figure 6:
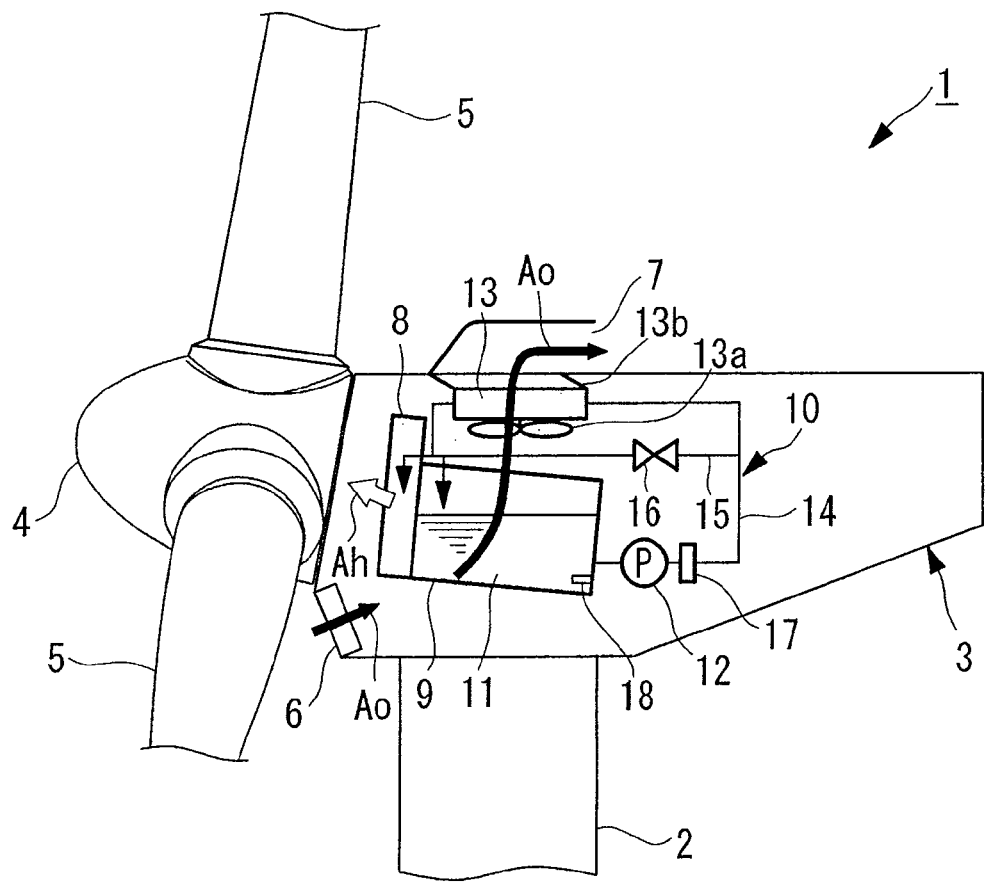
FIG. 6 is a system diagram showing a lubricating-oil circulation system in a nacelle according to a wind turbine generator of a related art example.
Figure 7:
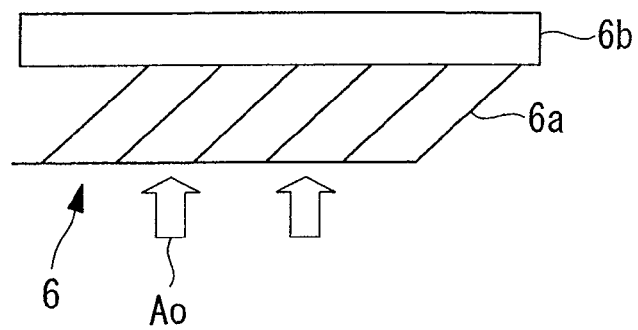
FIG. 7 is an enlarged cross-sectional view showing a configuration example of an air intake portion shown in FIG. 6.

In the case where the power output of the wind turbine generator 1, shown in FIG. 6, is about 2.5 MW, the required cooling capacity for the oil cooler 13 is about 100 kW, and thus, with an inlet temperature difference of 35° C., two oil coolers 13 with a heat exchange capacity of 50 kW are needed. The oil cooler 13 with a heat exchange capacity of 50 kW needs to be approximately 1 m in width, 1 m in height, and 90 mm in thickness and needs an air intake capacity of about 4 m3/s.

In contrast, with the wind turbine generator 1 having an increased power output of 6 MW, the required cooling capacity for the oil cooler 13 reaches about 300 kW. Therefore, in consideration of the inlet temperature difference between the lubricating oil and the nacelle air using the nacelle intake air of the related art, the oil cooler 13 needs to be 3 m in width, 3.5 m in height, and 90 mm in thickness, and the necessary air intake capacity increases to 42 m3/s.

In this case, the size of the oil cooler 13 is extremely large, substantially corresponding to the area of the vertical cross section of the nacelle 3, and in addition, air for cooling the heating devices in the nacelle 3 is needed, and thus, the total amount of air in the nacelle increases to about 45 m3/s.

However, the flow rate of the outside air passing through the air intake portion 6 at which the louver 6a and the salt-proof, dust-proof filter 6b are provided is limited to about 2 to 3 m/s in consideration of the pressure loss thereof and clogging of the air intake portion 6 due to dust. Therefore, the area of the nacelle air intake portion necessary in this case is as large as about 15 to 22 m2. These figures correspond to substantially twice as large as the vertical cross sectional area of the nacelle, which indicates that it would not be sufficient even if the entire front surface of the nacelle 3 were used as the air intake portion 6 of the nacelle 3.

Accordingly, the effective use of the performance of the heat exchanger by directly introducing the outside air, as in the embodiments described above, can easily increase the output of the wind turbine generator 1.

The present invention is not limited to the embodiments described above and can be changed as appropriate without departing from the spirit thereof.

REFERENCE SIGNS LIST

1 wind turbine generator
2 tower
3 nacelle
4 rotor head
5 wind turbine blade
6 air intake portion
7 exhaust portion
10, 10A, 10B lubricating-oil circulation system
11 oil tank
12, 12A oil pump
13 oil cooler (air-cooled heat exchanger)
14 lubricating oil pipe
50 air intake-exhaust duct
51, 51A air intake duct
52, 52A exhaust duct
53a, 53b wire mesh
54 oil sump
57 heat insulator
60 refrigerant circulation system
61 refrigerant pump
62 refrigerant pipe
63 refrigerant heat exchanger
64 air-cooled heat exchanger

The invention claimed is:

1. A wind turbine generator that generates electric power in such a manner that a rotor head that rotates when receiving wind power with wind turbine blades drives a generator installed inside a nacelle, the nacelle being installed at an upper end of a tower that is vertically erected on a foundation, and the wind turbine generator including a closed-circuit lubricating-oil circulation system in which lubricating oil circulates through devices installed in the nacelle, wherein
an air-cooled heat exchanger installed in the lubricating-oil circulation system to cool the lubricating oil by heat exchange with air is provided in a region separate from nacelle air;
the region separate from the nacelle air is an air intake-exhaust section formed to communicate with an interior of the nacelle via an opening provided in a wall surface of the nacelle; and
a heat insulator is disposed on a wall surface of the air intake-exhaust section.

2. The wind turbine generator according to claim 1, further comprising a sound absorbing chamber, in the air intake-exhaust section, formed by changing a cross-sectional area thereof.

3. The wind turbine generator according to claim 1, further comprising a droplet sump in which a predetermined amount of droplets can be held below the air-cooled heat exchanger provided in the air intake-exhaust section.

4. The wind turbine generator according to claim 1, further comprising an air intake duct and an exhaust duct that communicate with the interior of the nacelle via the opening in the wall surface of the nacelle, in which the air-cooled heat exchanger is disposed,
wherein the air intake duct or the exhaust duct is of a separated type.

5. The wind turbine generator according to claim 4, wherein
the air intake duct is disposed on an upstream side of the air-cooled heat exchanger, and
the exhaust duct is disposed on a downstream side of the air-cooled heat exchanger.

6. The wind turbine generator according to claim 5, wherein the upstream side and the downstream side are separated over the air-cooled heat exchanger.

7. A wind turbine generator that generates electric power in such a manner that a rotor head that rotates when receiving wind power drives a generator installed inside a nacelle, the nacelle being installed at an upper end of a tower that is vertically erected on a foundation, and the wind turbine generator including a closed-circuit lubricating-oil circulation system in which lubricating oil circulates through devices installed in the nacelle, the wind turbine generator comprising:
a refrigerant heat exchanger installed in the lubricating-oil circulation system to cool the lubricating oil by heat exchange with a refrigerant; and an air-cooled heat exchanger that cools the refrigerant by heat exchange with- air, wherein the air-cooled heat exchanger is provided in a region separate from nacelle air, wherein
the region separate from the nacelle air is an air intake-exhaust section formed to communicate with an interior of the nacelle via an opening provided in a wall surface of the nacelle; and
a heat insulator is disposed on a wall surface of the air intake-exhaust section.

8. The wind turbine generator according to claim 7, further comprising a droplet sump in which a predetermined amount of droplets can be held below the air-cooled heat exchanger provided in the air intake-exhaust section.

9. The wind turbine generator according to claim 7, further comprising an air intake duct and an exhaust duct that communicate with the interior of the nacelle via the opening in the wall surface of the nacelle and in which the air-cooled heat exchanger is disposed,
wherein the air intake duct or the exhaust duct is of a separated type.

10. The wind turbine generator according to claim 9, wherein
the air intake duct is disposed on an upstream side of the air-cooled heat exchanger, and
the exhaust duct is disposed on a downstream side of the air-cooled heat exchanger.

11. The wind turbine generator according to claim 10, wherein the upstream side and the downstream side are separated over the air-cooled heat exchanger.

12. A wind turbine generator that generates electric power in such a manner that a rotor head that rotates when receiving wind power drives a generator installed inside a nacelle, the nacelle being installed at an upper end of a tower that is vertically erected on a foundation, and the wind turbine generator including a closed-circuit lubricating-oil circulation system in which lubricating oil circulates through devices installed in the nacelle, the wind turbine generator comprising:
a refrigerant heat exchanger installed in the lubricating-oil circulation system to cool the lubricating oil by heat exchange with a refrigerant; and an air-cooled heat exchanger that cools the refrigerant by heat exchange with air, wherein the air-cooled heat exchanger is provided in a region separate from nacelle air; and
a sound absorbing chamber, in the air intake-exhaust section, formed by changing a cross-sectional area thereof.

13. The wind turbine generator according to claim 12, further comprising a droplet sump in which a predetermined amount of droplets can be held below the air-cooled heat exchanger provided in the air intake-exhaust section.

14. The wind turbine generator according to claim 12, further comprising an air intake duct and an exhaust duct that communicate with an interior of the nacelle via an opening in a wall surface of the nacelle and in which the air-cooled heat exchanger is disposed,
wherein the air intake duct or the exhaust duct is of a separated type.

15. The wind turbine generator according to claim 14, wherein
the air intake duct is disposed on an upstream side of the air-cooled heat exchanger, and
the exhaust duct is disposed on a downstream side of the air-cooled heat exchanger.

16. The wind turbine generator according to claim 15, wherein the upstream side and the downstream side are separated over the air-cooled heat exchanger.

* * * * *